US012265909B2

United States Patent
Rajani et al.

(10) Patent No.: US 12,265,909 B2
(45) Date of Patent: Apr. 1, 2025

(54) SYSTEMS AND METHODS FOR A K-NEAREST NEIGHBOR BASED MECHANISM OF NATURAL LANGUAGE PROCESSING MODELS

(71) Applicant: Salesforce, Inc., San Francisco, CA (US)

(72) Inventors: Nazneen Rajani, Mountain View, CA (US); Tong Niu, Sunnyvale, CA (US); Wenpeng Yin, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 1172 days.

(21) Appl. No.: 17/090,553

(22) Filed: Nov. 5, 2020

(65) Prior Publication Data
US 2021/0374488 A1   Dec. 2, 2021

Related U.S. Application Data

(60) Provisional application No. 63/033,197, filed on Jun. 1, 2020.

(51) Int. Cl.
*G06N 3/08* (2023.01)
*G06F 18/10* (2023.01)
(Continued)

(52) U.S. Cl.
CPC .............. *G06N 3/08* (2013.01); *G06F 18/10* (2023.01); *G06F 18/214* (2023.01);
(Continued)

(58) Field of Classification Search
CPC .......... G06N 3/08; G06N 3/063; G06F 18/10; G06F 18/214; G06F 18/2415; G06F 18/2414
See application file for complete search history.

(56) References Cited

U.S. PATENT DOCUMENTS 10,282,663 B2  5/2019  Socher et al.
10,346,721 B2  7/2019  Albright et al.
(Continued)

FOREIGN PATENT DOCUMENTS

CA    3067013 A1 *  1/2019  ........... G01V 99/005
CA    3115898 A1 *  4/2019  ......... G06K 9/00201
(Continued)

OTHER PUBLICATIONS

John T. Hancock etc., "Survey on categorical data for neural networks", published Apr. 10, 2020 in J Big Data 7, 28 (2020), and available at https://doi.org/10.1186/s40537-020-00305-w, retrieved Jan. 22, 2024. (Year: 2020).*
(Continued)

*Primary Examiner* — Shourjo Dasgupta
(74) *Attorney, Agent, or Firm* — Haynes and Boone, LLP

(57) ABSTRACT

Embodiments described herein adopts a k nearest neighbor (kNN) mechanism over a model's hidden representations to identify training examples closest to a given test example. Specifically, a training set of sequences and a test sequence are received, each of which is mapped to a respective hidden representation vector using a base model. A set of indices for each sequence index that minimizes a distance between the respective hidden state vector and a test hidden state vector is then determined A weighted k-nearest neighbor probability score can then be computed from the set of indices to generate a probability distribution over labels for the test sequence.

14 Claims, 8 Drawing Sheets

(51) Int. Cl.
  *G06F 18/214* (2023.01)
  *G06F 18/2413* (2023.01)
  *G06F 18/2415* (2023.01)
  *G06N 3/063* (2023.01)

(52) U.S. Cl.
  CPC .... *G06F 18/24147* (2023.01); *G06F 18/2415* (2023.01); *G06N 3/063* (2013.01)

(56) References Cited

U.S. PATENT DOCUMENTS

| | | |
|---|---|---|
| 10,474,709 B2 | 11/2019 | Paulus |
| 10,521,465 B2 | 12/2019 | Paulus |
| 10,542,270 B2 | 1/2020 | Zhou et al. |
| 10,546,217 B2 | 1/2020 | Albright et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,318 B2 | 2/2020 | Bradbury |
| 10,565,493 B2 | 2/2020 | Merity et al. |
| 10,573,295 B2 | 2/2020 | Zhou et al. |
| 10,592,767 B2 | 3/2020 | Trott et al. |
| 10,699,060 B2 | 6/2020 | Mccann |
| 10,747,761 B2 | 8/2020 | Zhong et al. |
| 10,776,581 B2 | 9/2020 | Mccann et al. |
| 10,783,875 B2 | 9/2020 | Hosseini-Asl et al. |
| 10,817,650 B2 | 10/2020 | Mccann et al. |
| 10,839,284 B2 | 11/2020 | Hashimoto et al. |
| 10,846,478 B2 | 11/2020 | Lu et al. |
| 10,902,289 B2 | 1/2021 | Gao et al. |
| 10,909,157 B2 | 2/2021 | Paulus et al. |
| 10,929,607 B2 | 2/2021 | Zhong et al. |
| 10,958,925 B2 | 3/2021 | Zhou et al. |
| 10,963,652 B2 | 3/2021 | Hashimoto et al. |
| 10,963,782 B2 | 3/2021 | Xiong et al. |
| 10,970,486 B2 | 4/2021 | Machado et al. |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher et al. |
| 2018/0096219 A1 | 4/2018 | Socher |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0268287 A1 | 9/2018 | Johansen et al. |
| 2018/0268298 A1 | 9/2018 | Johansen et al. |
| 2018/0336453 A1 | 11/2018 | Merity et al. |
| 2018/0373987 A1 | 12/2018 | Zhang et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0188568 A1 | 6/2019 | Keskar et al. |
| 2019/0213482 A1 | 7/2019 | Socher et al. |
| 2019/0220733 A1* | 7/2019 | Fisher .................. G06N 3/088 |
| 2019/0251431 A1 | 8/2019 | Keskar et al. |
| 2019/0258939 A1 | 8/2019 | Min et al. |
| 2019/0286073 A1 | 9/2019 | Asl et al. |
| 2019/0355270 A1 | 11/2019 | Mccann et al. |
| 2019/0362246 A1 | 11/2019 | Lin et al. |
| 2020/0005765 A1 | 1/2020 | Zhou et al. |
| 2020/0065651 A1 | 2/2020 | Merity et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0117861 A1 | 4/2020 | Bradbury |
| 2020/0142917 A1 | 5/2020 | Paulus |
| 2020/0175305 A1 | 6/2020 | Trott et al. |
| 2020/0193297 A1* | 6/2020 | Verhoef .................. G06N 3/084 |
| 2020/0234113 A1 | 7/2020 | Liu |
| 2020/0272940 A1 | 8/2020 | Sun et al. |
| 2020/0285704 A1 | 9/2020 | Rajani et al. |
| 2020/0285705 A1 | 9/2020 | Zheng et al. |
| 2020/0285706 A1 | 9/2020 | Singh et al. |
| 2020/0285993 A1 | 9/2020 | Liu et al. |
| 2020/0302178 A1 | 9/2020 | Gao et al. |
| 2020/0320382 A1* | 10/2020 | Burkhart ................ G06N 3/047 |
| 2020/0334334 A1 | 10/2020 | Keskar et al. |
| 2020/0364299 A1 | 11/2020 | Niu et al. |
| 2020/0364542 A1 | 11/2020 | Sun |
| 2020/0364580 A1 | 11/2020 | Shang et al. |
| 2020/0372116 A1 | 11/2020 | Gao et al. |
| 2020/0372319 A1 | 11/2020 | Sun et al. |
| 2020/0372339 A1 | 11/2020 | Che et al. |
| 2020/0372341 A1 | 11/2020 | Asai et al. |
| 2020/0380213 A1 | 12/2020 | Mccann et al. |
| 2021/0042604 A1 | 2/2021 | Hashimoto et al. |
| 2021/0049236 A1 | 2/2021 | Nguyen et al. |
| 2021/0073459 A1 | 3/2021 | Mccann et al. |
| 2021/0089588 A1 | 3/2021 | Le et al. |
| 2021/0089882 A1 | 3/2021 | Sun et al. |
| 2021/0089883 A1 | 3/2021 | Li et al. |

FOREIGN PATENT DOCUMENTS

| | | | | |
|---|---|---|---|---|
| CA | 3117333 | A1 * | 4/2020 | .......... G06F 11/3604 |
| CN | 108228757 | A * | 6/2018 | .......... G06F 16/5866 |

OTHER PUBLICATIONS

"Chapter 2 Tokenization" from Supervised Machine Learning for Text Analysis in R, published at https://smltar.com/tokenization.html as of Apr. 10, 2020, retrieved Jan. 22, 2024. (Year: 2020).*

Technical Fridays, "Scaling vs Normalization", published May 23, 2018 at https://kharshit.github.io/blog/2018/03/23/scaling-vs-normalization, retrieved Jan. 22, 2024. (Year: 2018).*

Eric Wallace etc., "Interpreting Neural Networks with Nearest Neighbors", published via the Proceedings of the 2018 EMNLP Workshop BlackboxNLP: Analyzing and Interpreting Neural Networks for NLP, pp. 136-144, Brussels, Belgium, Nov. 1, 2018, retrieved Jan. 22, 2024. (Year: 2018).*

Igor Kononenko, etc., "Machine Learning Basics", chapter in Machine Learning and Data Mining, published in 2007, retrieved Jul. 26, 2024 from https://www.sciencedirect.com/book/9781904275213/machine-learning-and-data-mining. (Year: 2007).*

"Label Errors and Confident Learning", published on Nov. 4, 2019 to https://dcai.csail.mit.edu/2024/label-errors, retrieved Jul. 26, 2024. (Year: 2019).*

GitHub, "How does the Softmax activation function work?", published on Jan. 8, 2020 to https://github.com/christianversloot/machine-learning-articles/blob/main/how-does-the-softmax-activation-function-work.md, retrieved Jul. 26, 24. (Year: 2020).*

Alvarez-Melis et al., "A causal framework for explaining the predictions of black-box sequence-to-sequence models," In Proceedings of the 2017 Conference on Empirical Methods in Natural Language Processing, 2017, pp. 412-421.

Bastings et al., "In-terpretable neural predictions with differentiable binary variables," In Proceedings of the 57th Annual Meeting of the Association for Computational Linguistics, 2019, pp. 2963-2977.

Bowman et al., "A large annotated corpus for learning natural language inference," In Proceedings of the 2015 Conference on Empirical Methods in Natural Language Processing ( EMNLP ). Association for Computational Linguistics, 2015.

Brunner et al., "On identifiability in transformers, In International Conference on Learning Representations," 2020.

Chang et al., "A game theoretic approach to classwise selective rationalization," In Advances in Neural In formation Processing Systems, 2019, pp. 10055-10065.

Dagan et al., "The pascal recognising textual entailment challenge," In Machine Learning Challenges Workshop, 2005, pp. 177-190.

Der Maaten et al., "Visualizing data using t-sne," Journal of machine learning research, 2008, pp. 2579-2605.

(56) References Cited

OTHER PUBLICATIONS

Devlin et al., "Bert: Pre-training of deep bidirectional transformers for language understanding," arXiv preprint arXiv:1810.04805, 2018.
Frenay et al., "Classification in the presence of label noise: a survey," IEEE transactions on neural networks and learning systems, vol. 25, No. 5, 2013, pp. 845-869.
Grave et al., "Improving neural language models with a continuous cache," JCLR, 2017b.
Grave et al., "Unbounded cache model for online language modeling with open vocabulary," In Advances in Neural Information Processing Systems, 2017a, pp. 6042-6052.
Gu et al., "Search engine guided neural machine translation," In Thirty-Second AAAI Conference on Artificial Intelligence, 2018.
Gururangan et al., "Annotation artifacts in natural language inference data," arXiv preprint arXiv:1803.02324, 2018.
Han et al., "Explaining black box predictions and unveiling data artifacts through influence functions," arXiv preprint arXiv:2005.06676, 2020.
Ioffe et al., "Batch normalization: Accelerating deep network training by reducing internal covariate shift," arXiv preprint arXiv:1502.03167, 2015.
Jain et al., "Attention is not Explanation," In Proceedings of the 2019 Conference of the North American Chapter of the Association for Computational Linguistics: Human Language Technologies, vol. 1 (Long and Short Papers), 2019, pp. 3543-3556.
Jia et al., "Adversarial examples for evaluating reading comprehension systems," arXiv preprint arXiv:1707.07328, 2017.
Johnson et al., "Billion-scale similarity search with gpus," IEEE Transactions on Big Data, 2019.
Kaushik et al., "Learning the difference that makes a difference with counterfactually-augmented data," In International Conference on Learning Representations, 2020.
Khandelwal et al., "Generalization through memorization: Nearest neighbor language models," ICLR, 2020.
Koh et al., "Understanding black-box predictions via influence functions," In Proceedings of the 34th International Conference on Machine Learning, vol. 70, 2017. pp. 1885-1894.
Kurita et al., "Weight poisoning attacks on pre-trained models," arXiv preprint arXiv:2004.06660, 2020.
Lei et al., "Rationalizing neural predictions," In Proceedings of the 2016 Conference on Empirical Methods in Natural Language Processing, 2016, pp. 107-117.
Li et al., "One sentence one model for neural machine translation," In Proceedings of the Eleventh International Conference on Language Resources and Evaluation (LREC-2018), Miyazaki, Japan. European Languages Resources Association (ELRA), 2018.
Liu et al., "Roberta: A robustly optimized bert pretraining approach," arXiv preprint arXiv: 1907.11692, 2019.
Maas et al., "Learning word vectors for sentiment analysis," In Proceedings of the 49th Annual Meeting of the Association for Computational Linguistics: Human Language Technologies, 2011, pp. 142-150.
McCoy et al., "Right for the wrong reasons: Diagnosing syntactic heuristics in natural language inference," arXiv preprint arXiv:1902.01007, 2019.
Nie et al., "Adversarial nli: A new benchmark for natural language understanding," arXiv preprint arXiv:1910.14599, 2019.
Papernot et al., "Deep k-nearest neighbors: Towards confident," interpretable and robust deep learning, 2018.
Poliak et al., "Hypothesis only baselines in natural language inference," arXiv preprint arXiv:1805.01042, 2018.
Pruthi et al., "Learning to deceive with attention-based explanations," In Annual Conference of the Association for Computational Linguistics (ACL), 2020.
Reimers et al., "Sentencebert: Sentence embeddings using siamese bertnetworks," arXiv preprint arXiv:1908.10084, 2019.
Ribeiro et al., "Anchors: High-precision modelagnostic explanations," In Thirty-Second AAAI Conference on Artificial Intelligence, 2018.
Ribeiro et al., "why should i trust you?" explaining the predictions of any classifier, In Proceedings of the 22nd ACM SIGKDD international conference on knowledge discovery and data mining, 2016, pp. 1135-1144.
Sato et al., "Interpretable adversarial perturbation in input embedding space for text," arXiv preprint arXiv:1805.02917, 2018.
Serrano et al., "Is attention interpretable?," In Proceedings of the 57th Annual Meeting of the Association for Computational Linguistics, 2019, pp. 2931-2951.
Singh et al., "Exs: Explainable search using local model agnostic interpretability," arXiv preprint arXiv:1809.03857, 2018.
Wallace et al., "Universal Adversarial Triggers for Attacking and Analyzing NLP," arXiv preprint arXiv:1908.07125, 2019.
Weston et al., "Retrieve and refine: Improved sequence generation models for dialogue," arXiv preprint arXiv:1808.04776, 2018.
Wiegreffe et al., "Attention is not not explanation," In Proceedings of the 2019 Conference on Empirical Methods in Natural Language Processing and the 9th International Joint Conference on Natural Language Processing (EMNLPIJCNLP), 2019, pp. 11-20.
Williams et al., "A broad-coverage challenge corpus for sentence understanding through inference," In Proceedings of the 2018 Conference of the North American Chapter of the Association for Computational Linguistics: Human Language Technologies, vol. 1 ( Long Papers), 2018, pp. 1112-1122.
Zhang et al., "Bertscore: Evaluating text generation with bert," arXiv preprint arXiv:1904.09675, 2019.
Zhao et al., "Reinforced curriculum learning on pretrained neural machine translation models," arXiv preprint arXiv:2004.05757, 2020.
Zhong et al., "Fine-grained sentiment analysis with faithful attention," arXiv preprint arXiv:1908.06870, 2019.

\* cited by examiner

500 ⎯

P: A Man Wearing a [White] Shirt and an [Orange] Shirt Jumped into the Air.
H: A Man's Feet are Not Touching the Ground.   GT: [Entailment]

P: Two Boxers are Fighting and the One in the [Purple] Short is Attempting to Block a Punch.
H: Both Boxers Wore [Black] Pants.   GT: [Contradiction]
P: A Woman Wearing a [Purple] Dress and [Black] Boots Walks Through a Crowd Drinking from a Glass Bottle.
H: The Woman is Drinking from a Plastic Bottle.   GT: [Contradiction]
P: The Woman in [Purple] Shorts and a [Brown] Vest has a [Black] Dog to the Right of her and a Dog Behind her.
H: A Woman is Walking Three Dogs.   GT: [Contradiction]
P: A Young Lady Wearing [Purple] and [Black] is Running Past an [Orange] Cone.
H: The young Lady is Walking Calmly.   GT: [Contradiction]

P: A Man and Woman Stand in Front of a Large Red Modern Statue.
H: The Man and Woman are not Sitting.   GT: [Entailment]
P: Three Guys Sitting on Rocks Looking at the Scenery.
H: The People are Not Standing   GT: [Entailment]
P: Two Boys are Playing Ball in an Alley.
H: The Boys are not Dancing.   GT: [Entailment].
P: A Girl is Blowing at a Dandelion.
H: The Girl isn't Swimming in a Pool.   GT: [Entailment]

P: A Man Wearing a [White] [Shirt] and an [Orange] [Shirt] Jumped into [the] [Air.]
H: A Man'[s] [Feet] [are] Not [Touching] [the] [Ground.]

NOT Contradiction   Contradiction

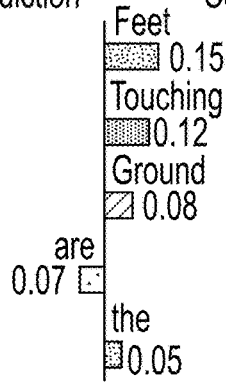

P: A Young Man Dressed in Black Dress Clothes Lies down with his Head Resting in the Lap of an Older Man in Plain Clothes.
H: One Man is Dressed Up for a Night Out while the Other is Not.   GT: [Neutral]

P: There is a Performance with a Man in a T-shirt and Jeans with a Woman in All Black while an Audience Watches and Laughs.
H: The Man and woman are friends.   GT: [neutral]
P: A Man in a Black Shirt Plays the Guitar Surrounded by Drinks.
H: The Man is Skilled at Playing.   GT: [neutral]
P: An Older Guy is Playing Chess with a Young Boy.
H: Two Generations Play an Ancient Game.   GT: [Entailment]
P: A Young Girl Skiing Along Side an Adult.
H: The Young Girl is the Adult's Child.   GT: [Neutral]

P: Many People in White Smocks Look at Things Under Identical Looking Microscopes.
H: Multiple Humans are Not Looking Under Microscopes.   GT: [Entailment]
P: A Small Girl Dancing in a Parade Wearing Bright Red and Gold Clothes.
H: The Small Girl is Sitting at Home, Not Celebrating.   GT: [Contradiction]
P: A Five-Piece Band, Four of the Men in Red Outfits and One of Them in a Leather Jacket and Jeans, Perform on the Sidewalk in Front of a Shop.
H: The Five-Piece Band of Women in red is Not Performing.   GT: [Contradiction]
P: Three Young Girls Chapping and Texting on a Cellphone.
H: Three Young Girls are Sitting Together and Not Communicating.   GT: [Contradiction]

P: A Man Wearing a White Shirt and an Orange Shirt Jumped into the Air.
H: One Man's [Feet] [are] [Not] [Touching] the Ground   GT: [Neutral]

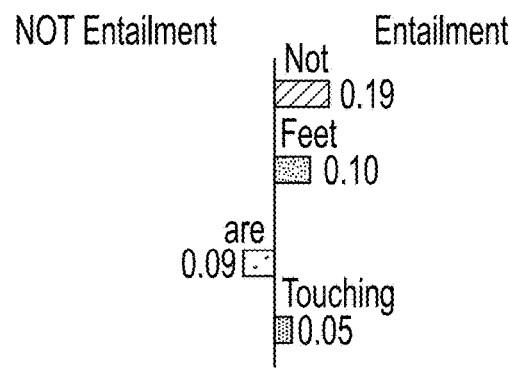

*FIG. 6B*

| | SNLI | | ANLI | HANS |
| --- | --- | --- | --- | --- |
| | Original $k=16$ | Augmented $k=16$ | $k=64$ | $k=64$ |
| BERT | 75.7 | 70.5 | 47.2 | 52.4 |
| kNN-BERT | 75.8 | 71.0 | 48.5 | 52.4 |
| RoBERTa | 82.8 | 76.8 | 44.4 | 59.3 |
| kNN-RoBERTa | 82.8 | 77.3 | 47.9 | 59.6 |

| Dataset | BERT | RoBERTa |
| --- | --- | --- |
| SNLI original | 0.74 | 0.55 |
| SNLI augmented | 0.53 | 0.40 |
| ANLI | 0.95 | 0.96 |
| HANS | 0.84 | 0.62 |

Ground truth

RoBERTa

RoBERTa + kNN

SYSTEMS AND METHODS FOR A K-NEAREST NEIGHBOR BASED MECHANISM OF NATURAL LANGUAGE PROCESSING MODELS

CROSS-REFERENCES

The present application is a nonprovisional of and claims priority under 35 U.S.C. 119 to U.S. provisional application No. 63/033,197, filed Jun. 1, 2020, which is hereby expressly incorporated by reference herein in its entirety.

TECHNICAL FIELD

The present disclosure relates generally to machine learning models and neural networks, and more specifically, to explaining and improving model behavior with k-nearest neighbor representations.

BACKGROUND

Deep learning models have been traditionally opaque and non-transparent with respect to their behaviors, which has led to a black box alike implementation. Such lack of transparency can sometimes be undesirable because the lack of understanding of the inner mechanism inside the "black box" hinders performance improvement and design of the deep learning models. For example, for a natural language processing (NLP) model, only the output text is visible, but often at times, how and why the output text is generated in response to the input text is largely unknown. Existing interpretability techniques for deep learning models, such as NLP models, have focused on explaining individual prediction by using gradient-based saliency maps over the input text or interpreting attention. These existing methods, however, are often limited to understanding model behavior for example-specific predictions only.

BRIEF DESCRIPTION OF THE DRAWINGS

FIG. 5A shows an example diagram illustrating example results of the kNN relating to classifying relationships between input pairs, according to embodiments described herein.

FIG. 5B shows the saliency map verifying the patterns uncovered in FIG. 5A, according to embodiments described herein.

FIG. 6A shows an example diagram illustrating example results of kNN when trained on augmented data, according to embodiments described herein.

FIG. 6B shows the salience map verifying the patterns uncovered in FIG. 6A, according to embodiments described herein.

In the figures and appendix, elements having the same designations have the same or similar functions.

DETAILED DESCRIPTION

To understand model behaviors of deep learning models, some existing interpretability techniques for NLP models have focused on explaining individual prediction by using gradient-based saliency maps over the input text or interpreting attention. However, these methods are limited to understanding model behavior for example-specific prediction. Some other techniques including using influence functions may explain a model's prediction by tracing it back to the training examples responsible for that prediction. These methods, however, are limited to identifying influential training examples only.

In view of the need to improve interpretability of deep learning models, k-nearest neighbor (kNN) over the model's hidden representations are used to identify training examples that are closest to a given evaluation example. These training examples are thus responsible for the model behavior in its predictions. By examining the retrieved representations in the context of the evaluation example, a dataset-level understanding of the model behavior can be obtained, e.g., which data samples contribute to the specific model behavior such as predicting an output in a certain way.

Specifically, a k-nearest neighbor (kNN) mechanism is applied over a model's hidden representations to identify training examples closest to a given test example. By varying the value of k and examining the nearest neighbors, a corpus-level understanding of the model behavior can be obtained. The implementation of the kNN can be used with any underlying classification or generation model, e.g., not limited to any specific examples. In addition, the kNN mechanism may identify the nearest training examples in a model's representation space and also leverage them to obtain improvements in model predictions.

In some embodiments, kNN models learn fine-grained decision boundaries due to its added non-linearity, which can make it more robust to certain kinds of spurious correlations in the training data. Thus, the provided robustness can be leveraged for studying where the models go wrong and demonstrate how the nearest neighbors of a model's misclassified examples can reveal artifacts and spurious correlations. Indeed, the kNN of misclassified test examples can often retrieve mislabeled examples, which makes this approach applicable to fixing mislabeled ground truth examples in training sets.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
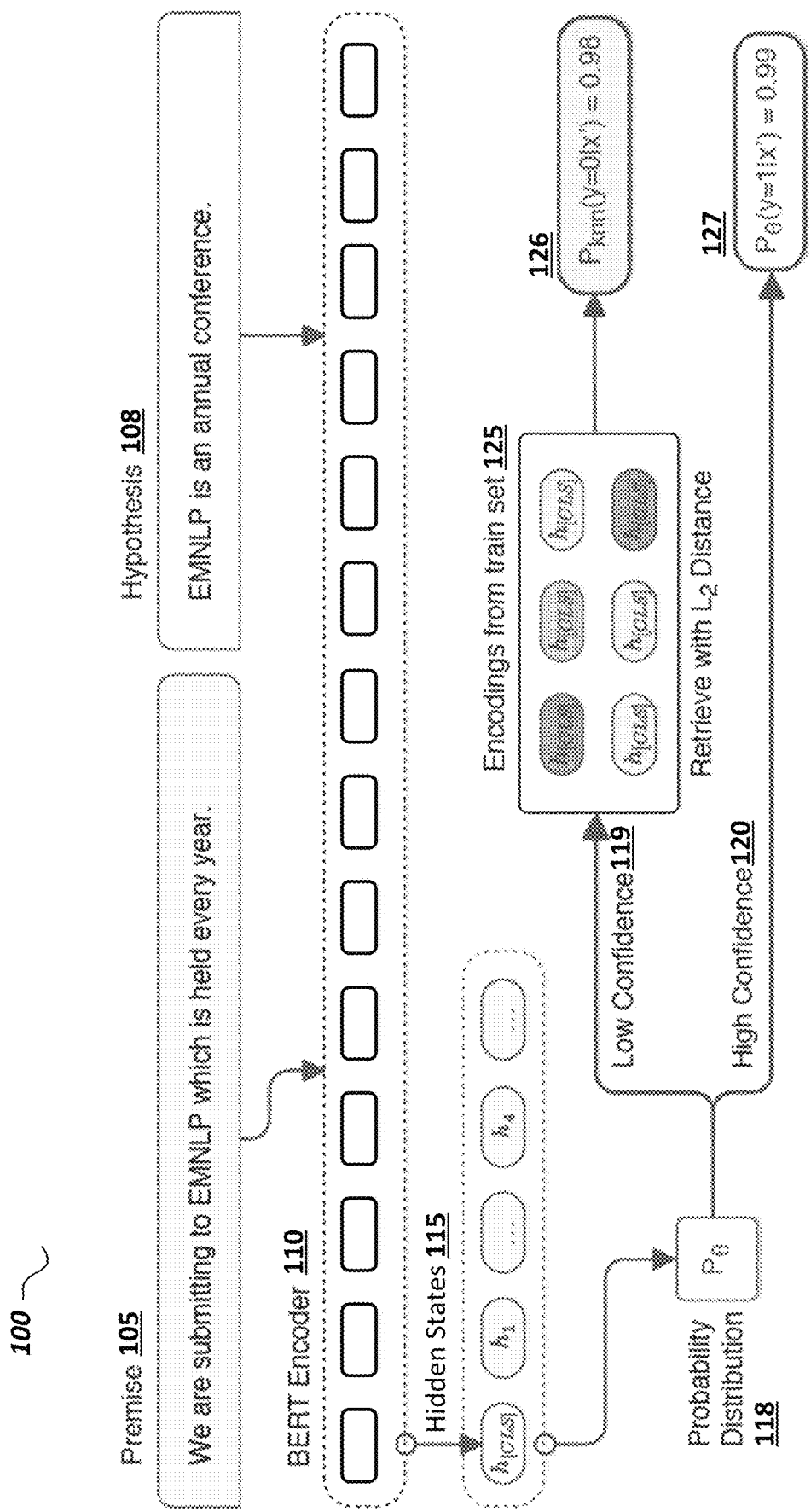
FIG. 1 is a simplified diagram illustrating an overview of using a k-nearest neighbor (kNN) mechanism as a back-off to improve fine-tuned base models, according to embodiments described herein.

FIG. 1 is a simplified diagram 100 illustrating an overview of using a kNN mechanism as a back-off to improve fine-tuned base models, according to embodiments described herein. Diagram 100 shows a base model which may include a Bidirectional Encoder Representations from Transformers (BERT) model 110, which may be improved by the kNN mechanism. Specifically, the output hidden representation 115 of every training sequence may be stored. During inference, based on the confidence score of each particular output from the BERT model 110, the prediction output may be used to produce a classification label, or may instead back off to the kNN prediction. If kNN is deployed, the cache may be queried to retrieve the nearest neighbors for a given example and make a prediction based on the weighted distance for each class.

For example, Diagram 110 illustrates a specific example of employing kNN on the natural language inference (NLI) tasks via a BERT model 110. The input to the BERT model 110 is a pair of sentences 105 and 108—the premise 105 and the hypothesis 108, and the BERT model 110 is to predict the relationship between the two sentences 105 and 108. The possible labels are "entailment," "contradiction," or "neutral."

A training set of such premises 105 and hypothesis 108 pairs may be fed to the BERT model 110. Each training sequence $(x^{(i)})$ is paired with a target label $y^{(i)}$. For instance, the training sequence of the premise sentence 105 "we are submitting to EMNLP which is held every year," and the hypothesis sentence 108 "EMNLP is an annual conference" may have a relationship label of "entailment." The encoder of the BERT model 110 may then map each $x^{(i)}$ to the hidden states in the last layer of the encoder. During training, the hidden states 115 generated by various different training sequences may be stored at a cache memory, e.g., memory 320 in FIG. 3.

The encoded tokens of input sequence 105 and 108 may then be used by the BERT model 110 to generate a prediction probability distribution 118, e.g., over the possible target labels "entailment," "neural," and "contradiction" in the example shown in FIG. 1. During inference, a confidence score is also generated by the BERT model 110. For example, the confidence score corresponds to the output probability of the predicted class, ranging from 0.0 to 1.0. When the confidence score is low at 119 (e.g., lower than a threshold), the stored hidden states encodings 125 may be retrieved from cache memory, and the k-nearest neighbors to the hidden states 115 may be selected from the stored hidden states 125. Then selected kNN may be used to compute a kNN probability 126.

Otherwise, if the prediction probability distribution 118 is associated with a good-enough confidence score 120, e.g., higher than the threshold, the probability distribution 118 may be used to generate a predicted label 127.

Figure 2:
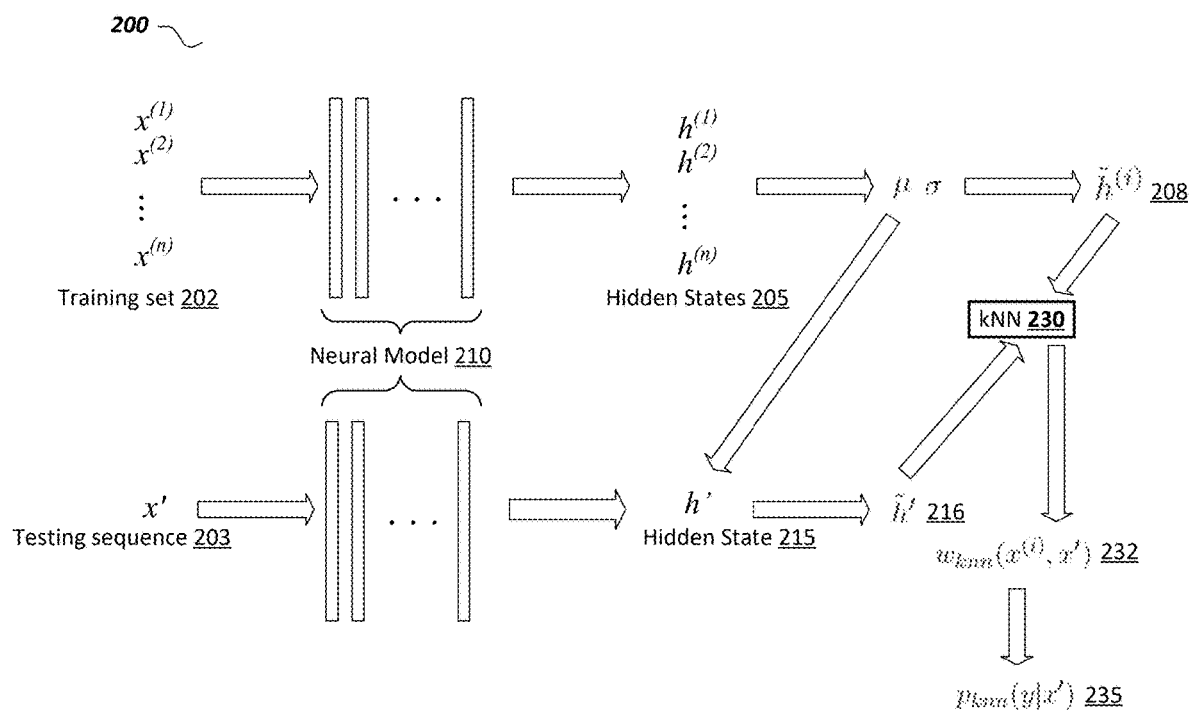
FIG. 2 is a simplified diagram illustrating details of the kNN mechanism, according to embodiments described herein.

FIG. 2 is a simplified diagram 200 illustrating details of the kNN mechanism, according to embodiments described herein. Diagram 200 shows that a training set 202 of training sequences $\{x^{(1)}, x^{(2)}, \ldots, x^{(m)}\}$ may be mapped, by a neural model 210, to hidden state vectors 205, represented by $h^{(i)} \in \mathbb{R}^d$, where d is the hidden state dimension, using function $f_\theta$ defined by the neural model 210 with parameters $\theta$:

$$h^{(i)} = f_\theta(x^{(i)}).$$

These hidden states $h^{(i)}$ can then be collected and cached with one forward pass through the training set. For scaling to larger data sets, a similarity search mechanism may be implemented for storing the cache that allows for faster kNN lookup and reduces memory usage. The stored hidden states $h^{(i)}$ may then be used to compute element-wise means $\mu \in \mathbb{R}^d$ and standard deviations $\sigma \in \mathbb{R}^d$ over the hidden states 205. In some implementations, the element-wise means $\mu \in \mathbb{R}^d$ and standard deviations $\sigma \in \mathbb{R}^d$ may be computed through a batch of training sequences. In some implementations, when the training set is large, the estimated mean and standard variances may be computed from a subset of training sequences.

Dataset-wise batch normalization may then be applied to the hidden state vectors with means $\mu \in \mathbb{R}^d$ and standard deviations $\sigma \in \mathbb{R}^d$ to result in the normalized hidden states 208:

$$\tilde{h}^{(i)} = \frac{h^{(i)} - \mu}{\sigma + \epsilon}.$$

with a small $\epsilon$ used for numerical stability. A testing sequence 203 x' can then be mapped, by the neural model 210, to hidden states 215 h'. With the means $\mu \in \mathbb{R}^d$ and standard deviations $\sigma \in \mathbb{R}^d$ over the hidden states 205 stored in the cache, a normalized hidden state vector 216 corresponding to the testing sequence 203 may be computed in a similar manner:

$$\tilde{h}' = \frac{f_\theta(x') - \mu}{\sigma + \epsilon}.$$

The normalized hidden states 216 $\tilde{h}'$ and normalized hidden states 208 $\tilde{h}^{(i)}$ are then sent to the kNN module 230, which identifies the set of indices K for each i which result in the smallest $L_2$ distances, given by: $d^{(i)} = \|\tilde{h}' - \tilde{h}^{(i)}\|^2$. The weighted kNN probability scores $w_{knn}(x^{(i)}, x')$ 232 are then computed, e.g., using a softmax over negative distances:

$$w_{knn}(x^{(i)}, x') = \begin{cases} \dfrac{\exp\left(-\dfrac{d^{(i)}}{T}\right)}{\sum_{j \in K} \exp\left(-\dfrac{d^{(j)}}{T}\right)}, & \text{if } i \in K \\ 0, & \text{otherwise.} \end{cases}$$

where T is a temperature hyper-parameter that controls the sharpness of the softmax. The probability distribution $p_{knn}(y|x')$ 235 is generated over the labels for the test sequence, e.g., $$p_{knn}(y|x') = \Sigma_{j \in K} w_{knn}(x^{(j)}, x') \times e_{y^{(j)}}.$$

where $e_{y^{(j)}}$ is a one hot encoding of $y^{(j)}$ equal to one at the index of $y^{(j)}$ and zero at the index of all other labels. Thus, the $p_{knn}(y|x')$ can be used directly as a classifier or interpolated with the base neural network probability distribution $p_\theta(y|x')$.

In some implementations, the generated probability distribution $p_{knn}(y|x')$ may then be used to generate a classifier prediction. For example, a kNN classifier is used when the model is less confident in its predictions, e.g., as shown at 119 in FIG. 1. Given a threshold hyper-parameter $\tau$, the classifier prediction is given by:

$$y = \begin{cases} \arg\max p_\theta(y|x'), & \text{if } \max p_\theta(y|x') > \tau \\ \arg\max p_{knn}(y|x'), & \text{otherwise.} \end{cases}$$

the hyper parameter $\tau$ and T are determined based on each model and the validation set. The value of k may be tuned based on the validation set of each dataset, and the same value of k may be used for all models trained on the respective dataset.

In some embodiments, the hidden representations used by kNN module 230 are crucial in determining the performance of our method. For example, the representation of the [CLS] token that is added at the beginning of the input sequence, from the last layer, may be an option for the hidden states 205. In another example, mean and maximum token from the input sequence may also be used for choosing the hidden states 205 and 215. In other examples, representations of hidden states from other layers of the neural models may also be used as the hidden states 205 and 215. However, experiments show that the [CLS] representation of the last layer as the hidden states 205 and 215 may yield the best performance.

In some embodiments, the kNN back-off approach described in FIGS. 1-2 may be used to identify mislabeled examples. For example, datasets used for training deep learning models may contain noisy labels depending on how the data was collected. Even crowd-sourced datasets can sometimes have mislabeled examples. The kNN can be leveraged for identifying potentially mislabeled examples. For example, kNN may sometimes retrieve mislabeled examples, and that these specific instances tended to occur when kNN's prediction was different from the model prediction. For example, a mislabel may be identified when:

$$\arg\max p_\theta(y|x') \neq \arg\max p_{knn}(y|x').$$

Figure 3:
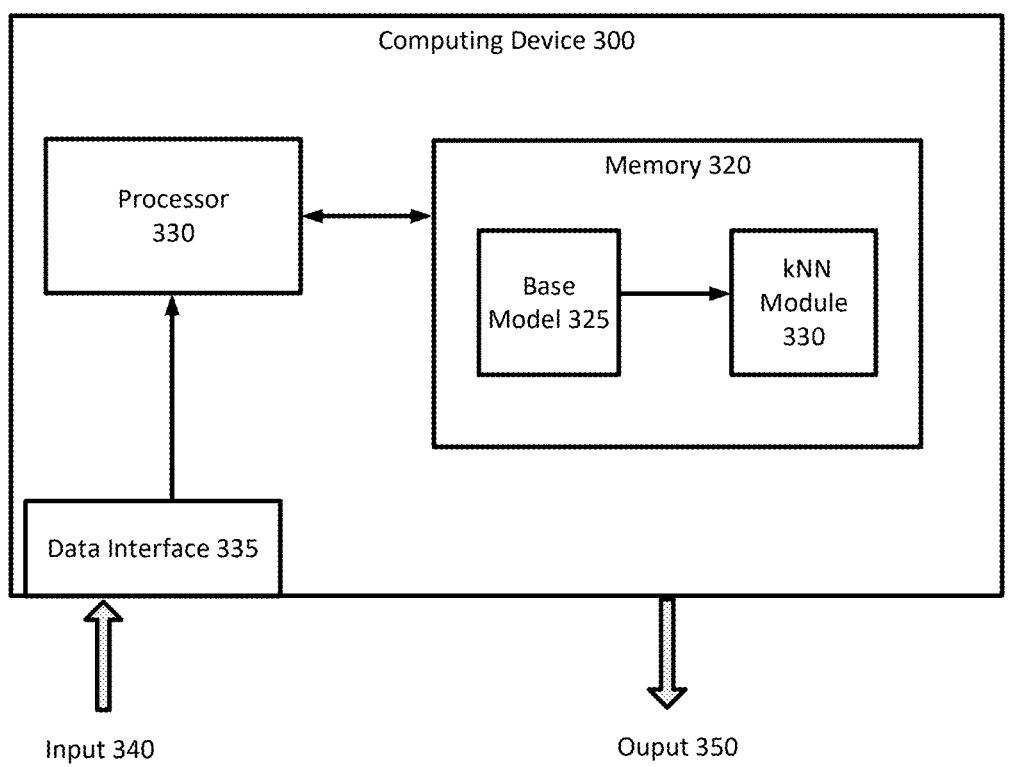
FIG. 3 is a simplified diagram of a computing device for implementing the kNN framework shown in FIGS. 1-2, according to some embodiments.

FIG. 3 is a simplified diagram of a computing device for implementing the kNN framework shown in FIGS. 1-2, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a base model 325 and a kNN module 330 that may be used to implement and/or emulate the systems and models, and/or to implement any of the methods described further herein. In some examples, the kNN module 330 may communicate with the base model which can be a language model (e.g., BERT, RoBERTa, etc.). The kNN module 330 is configured to utilize the base model's 325 hidden representations to identify training examples closest to a given test example so as to learn model behavior. For example, the kNN module 330 may be similar to the kNN module 230 as described in relation to FIG. 2.

In some embodiments, the base model 325 receives an input 340, e.g., a training sequence or test sequence, via a data interface 315. Together with the kNN module 320, the base model 325 may generate an output 350, e.g., a probability distribution over labels for the training or test sequence.

In some examples, the kNN module 330 and the base model 325 may be implemented using hardware, software, and/or a combination of hardware and software. Further operations of the kNN module 330 and the base model 325 may be described in relation to FIG. 4.

Figure 4:
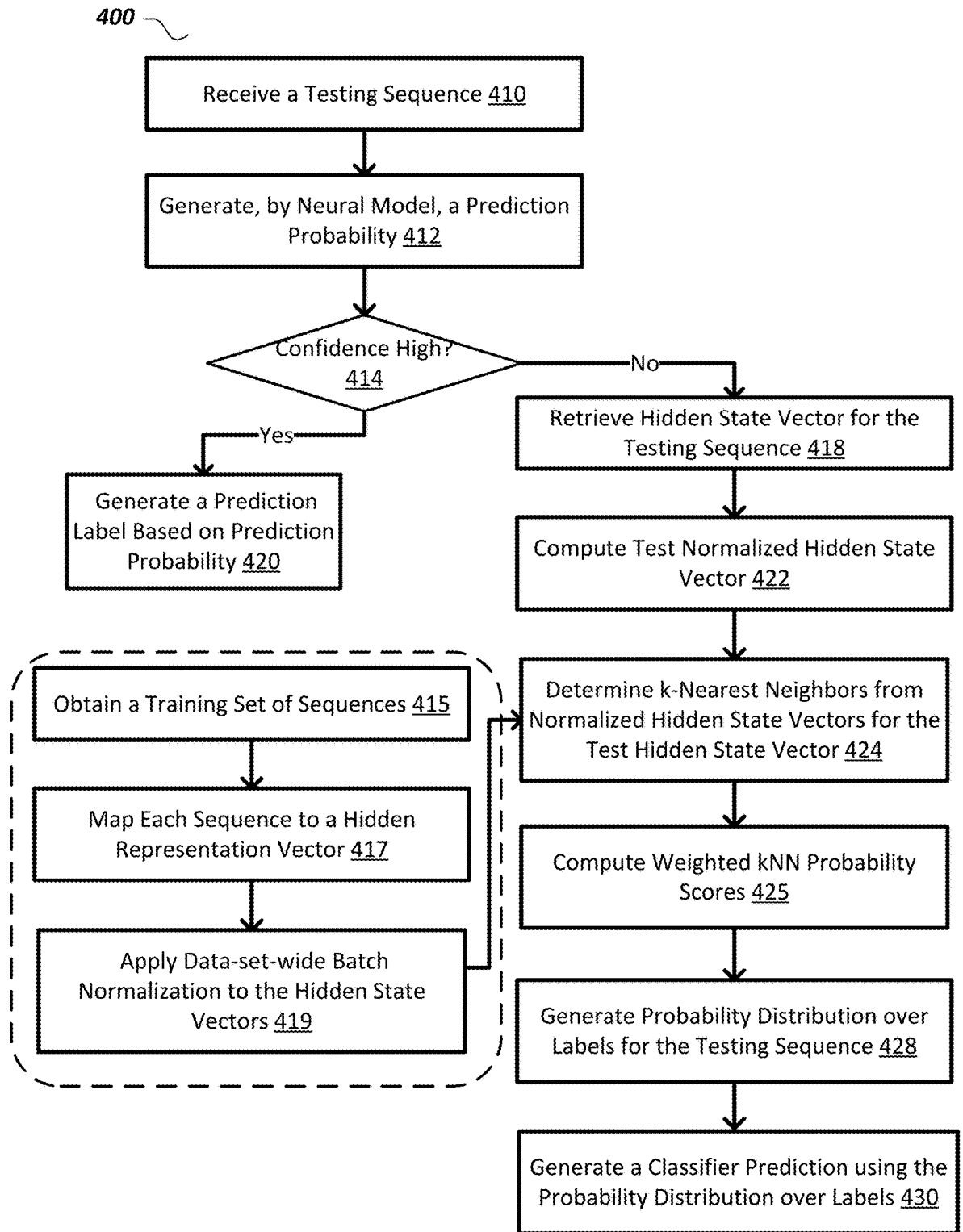
FIG. 4 is a simplified logic flow diagram illustrating a method for using k-nearest neighbors over hidden representations to improve model behavior by the kNN module shown in FIG. 3, according to some embodiments.

FIG. 4 is a simplified logic flow diagram illustrating a method for using k-nearest neighbors over hidden representations to improve model behavior by the kNN module 330 shown in FIG. 3, according to some embodiments. One or more of the processes 410-430 of method 400 may be implemented, at least in part, in the form of executable code stored on non-transitory, tangible, machine-readable media that when run by one or more processors may cause the one or more processors to perform one or more of the processes 410-430. In some embodiments, method 400 may correspond to the method used by the module 330 and 325.

At process 410, during inference, a testing sequence may be obtained for the neural model. For example, the testing sequence may be similar to the pair of premise 105 and hypothesis 108 shown in FIG. 1, and the neural model may be a classification model to decide a relationship between the premise 105 and hypothesis 108.

At process 412, a prediction probability may be generated by the neural model. For example, the probability over labels "entailment," "contradiction" or "neutral" may be generated by the classification model to indicate the relationship between the premise 105 and the hypothesis 108.

At process 414, a confidence score may also be generated accompanying the prediction probability. If the confidence score is high (e.g., greater than a threshold), the prediction probability may be used to generate a prediction label at process 420. Otherwise, If the confidence score is low (e.g., lower than the threshold), method 400 proceeds to process 418, where the hidden state vector (e.g., 215) is retrieved for the testing sequence.

At process 422, a test normalized hidden state vector is computed, e.g., 216.

In some embodiments, during training stage of the neural model, as shown in the box with dashed line, at process 415, a training set of sequences may be obtained by the neural model, e.g., see 202. At process 417, each training sequence is mapped to a hidden representation vector, e.g., 205, which may be cached for use at the inference stage. At process 419, data-set-wide batch normalization may be applied to the hidden state vectors to generate normalized vectors, e.g., 216.

At process 424, the kNN from normalized hidden state vectors for the test hidden state vectors can be determined, e.g., by querying the cached normalized hidden state vectors from training stage. At process 425, the weighted kNN probabilities can be computed using the kNN. At process 428, probability distribution can then be generated over labels for the testing sequence based on the computed weighted kNN probability scores. At process 430, a classifier prediction is generated using the probability distribution over labels.

Method 400 may be applied to various tasks with different base models. For example, for classification tasks, method 400 may be applied with BERT, RoBERTa, and/or the like, with different datasets such as Adversarial Natural Language Inference (ANLI), Stanford Natural Language Inference (SNLI), IMDB, Yahoo topics, and/or the like. For another example, for translation tasks, method 400 may be applied with 2 or 3 datasets such as En-German, En-Romanian, etc.

Performance Examples

The training set 202 to train the neural model 210 may include augmented and adversarial versions of the original datasets to gain a deeper understanding of how the model behavior changes. Example dataset may include the Stanford Natural Language Inference (SNLI) dataset, which is a widely used corpus for the NLI task. A revised corpus consists of a very small sample of the original dataset (0.3%) called the original split. The original split is augmented with counterfactuals by asking crowd-workers to make minimum changes in the original example that would flip the label. This leads to three more splits—the revised premise wherein only the premise is augmented, the revised hypothesis wherein only the hypothesis is augmented or the combined that consists of both premise and hypothesis augmentations along with the original sentence pairs. The original and combined splits (referred to as augmented split) are used in data experiments that have training data sizes of 1666 and 8330 respectively. For validation and testing on the original split, the SNLI validation and test sets with sizes 9842 and 9824 are used, respectively. For the combined split, the combined validation and test sets with sizes 1000 and 2000 are used, respectively.

Another example of the training dataset 202 is the adversarial NLI (ANLI) dataset. ANLI is a large-scale NLI dataset collected via an iterative, adversarial human-and-model-in-the-loop procedure. In each round, a best-performing model from the previous round is present, then human annotators are asked to write "hard" examples the model misclassified. They always choose multi-sentence paragraphs as premises and write single sentences as hypotheses. Then a part of those "hard" examples join the training set so as to learn a stronger model for the next round. The remaining part of "hard" examples act as dev/test set correspondingly. A total of three rounds were accomplished for ANLI construction. In the end, ANLI has train/validation/test split sizes of 162,865/3200/3200 input pairs. The same splits may be used for training, validation and test.

Another example of the training dataset 202 is the heuristic Analysis for NLI Systems (HANS) is a controlled evaluation dataset aiming to probe if a model has learned the following three kinds of spurious heuristic signals: lexical overlap, subsequence, and constituent. This dataset intentionally includes examples where relying on these heuristics fail by generating from 10 predefined templates. This dataset is challenging because state-of-the-art models like BERT perform very poorly on it. There are in total 30,000 examples—10,000 for each heuristic. The HANS dataset is used only for validating and testing the neural model that are trained on the ANLI dataset. The HANS dataset has only two classes, 'entail' and 'not-entail' while ANLI has 3 classes so the 'neutral' and 'contradiction' predictions are collapsed into 'not-entail'. A total of 30K examples are randomly split into 10K for validation and 20K for testing while maintaining the balance across the different heuristics in both the splits.

The neural model 210 may be a transformer model such as the BERT (see Devlin et al., Bert: Pre-training of deep bidirectional transformers for language understanding, arXiv preprint arXiv:1810.04805, 2018), and the so-called robust version of BERT, the RoBERTa (see Liu et al., Roberta: A robustly optimized BERT pretraining approach, arXiv preprint arXiv:1907.11692, 2019). For both models the base versions are used with 110M and 125M parameters.

The most similar training examples retrieved by kNN provide context for a given input in the representation space of the model and thereby provide an understanding for why the model made a certain prediction. Experiments are run to test at data set level if the retrieved training examples are actually the ones that the model relies on to learn its decision boundary. This is done by removing a percentage of the training examples most frequently retrieved by kNN (with k=16) on the dev set, retrain the model from initialization, re-evaluate the model. This procedure is repeated to average results over three random seeds. On the original SNLI split on average BERT's performance drops by 4.6% when the top 10% of the 1666 training examples are removed vs. 1.2% when an equal amount of random examples are re-moved. The performance further drops by another 6% when the percentage is increased to 30% vs. 4% for random.

Spurious associations are caused by a model con-founding the statistical co-occurrence of a pattern in the input and a class label with high mutual in-formation between the two. For example, state-of-the-art models are known to associate high lexical overlap between the premise and the hypothesis with the label entailment. So models that rely on this association may fail spectacularly when the subject and the object are switched. Counterfactual data augmentation alleviates this problem by reducing the co-occurrence of such artifacts and the associated class label. kNN provides a tool for uncovering potential spurious associations. First, the nearest neighbors of misclassified examples are examined for possible spurious patterns. Next, feature-importance methods like LIME are used to verify the pattern by comparing it to the highest-weighted word features.

FIG. 5A shows an example diagram 500 illustrating example results of the kNN relating to classifying relationships between input pairs, according to embodiments described herein. Diagram 500 shows potential spurious association between mention of colors and contradiction label uncovered by kNN when BERT is trained on the original split. As shown, counterfactual augmentation helps in debiasing the model and BERT is then able to classify the same example correctly. FIG. 5B shows the saliency map 510 verifying the patterns uncovered in FIG. 5A.

FIG. 6A shows an example diagram 600 where BERT's prediction goes from neutral to contradiction when trained on augmented data. The nearest neighbors reveal that BERT learns to correlate the occurrence of negation in the hypothesis with contradiction. LIME verifies that the most highly weighted feature is the occurrence of 'not' as shown in FIG.

6B. Quantitatively, the pattern 'not' occurs approximately 37% and 60% of times in the original and augmented training splits of SNLI respectively. The accuracy of BERT on identifying entailment examples that contain negation drops by 10% when trained with augmented data versus without. Diagram 610 shows the saliency map of words that were highly-weighted in BERT's prediction using LIME. The model trained on augmented data learns to spuriously associate the occurrence of 'not' with the contradiction class.

Figures 7, 8, 9:
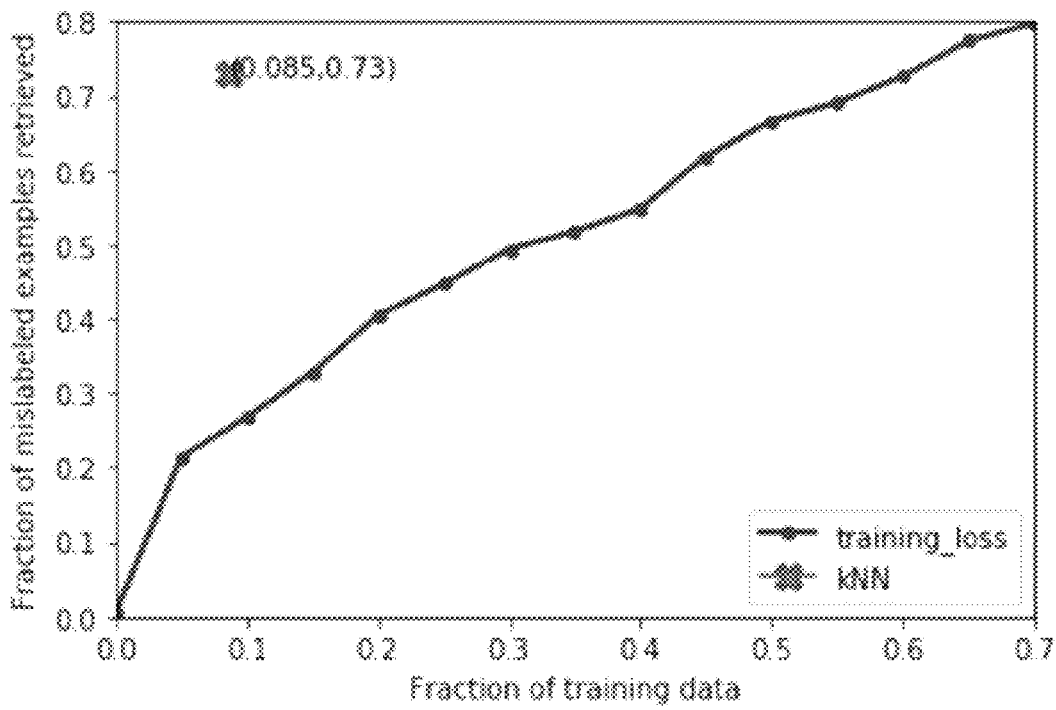
FIG. 7 shows a training loss performance plot of the baseline model with respect to the fraction of training data and the corresponding recall using kNN, according to embodiments described herein.
FIGS. 8, 9 and 10A-10C provide various performance plots illustrating kNN performance with different baseline models, according to embodiments described herein.

FIG. 7 shows a training loss performance plot of the baseline model with respect to the fraction of training data and the corresponding recall using kNN. For example, in a data experiment, a dataset generated by intentionally mislabeling 10% of examples on the original training split of the Stanford Natural Language Inference (SNLI) dataset with 1666 examples may be used, and kNN is used to recover them by comparing with the model's prediction, in a similar way as described in relation to FIG. 1. For example, a mislabel may be identified when:

$$\arg\max p_\theta(y|x') \neq \arg\max p_{knn}(y|x').$$

A set of candidate mislabeled training examples can be obtained by comparing BERT's prediction on the dev set to the label of the immediate nearest neighbor (k=1) for that example.

As shown in FIG. 7, kNN is much more effective at identifying the mislabeled examples compared to the baseline that requires about 65% of the training data ranked by loss to get to the same performance. The same approach is applied to the counterfactually augmented split of SNLI and kNN effectively uncovers several mislabeled examples.

Apart from explaining model behavior and identifying mislabeled examples, mechanisms are explored for leveraging kNN to further improve fine-tuned model predictions. The kNN has the ability to learn a highly non-linear boundary and thus improve performance of fine-tuned models on examples that the baseline model is not good at classifying. As described in FIG. 1, kNN is deployed as a back-off for low confidence pre-dictions by learning a threshold on the validation set, below which the model's predictions are very unreliable. Another criteria could be defining slices of data that satisfy a property on which the model is known to perform poorly. Examples include inputs that contain gendered words or fallible patterns for a model.

FIG. 8 provides a performance table shows the performance of BERT and RoBERTa with and without kNN on the overall test set for various NLI datasets. Combining kNN with the underlying model obtains highest performance on the ANLI dataset, significantly outperforming the fine-tuned versions for both BERT and RoBERTa. FIG. 9 provides the example parameter τ used for switching to kNN identified on the validation sets.

Figure 10A:
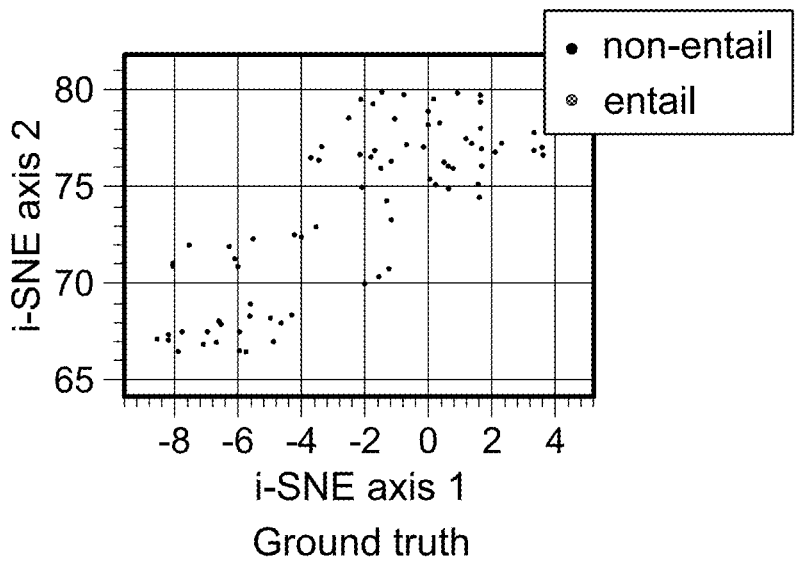
Figure 10B:
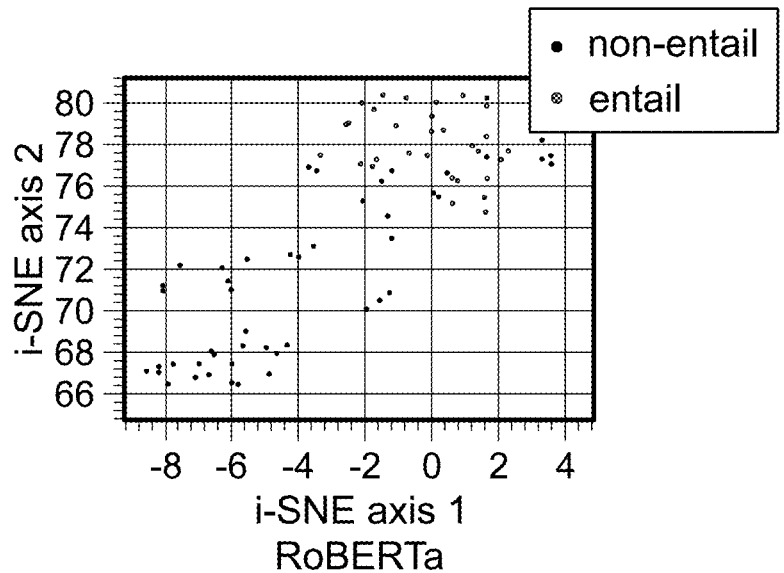
Figure 10C:
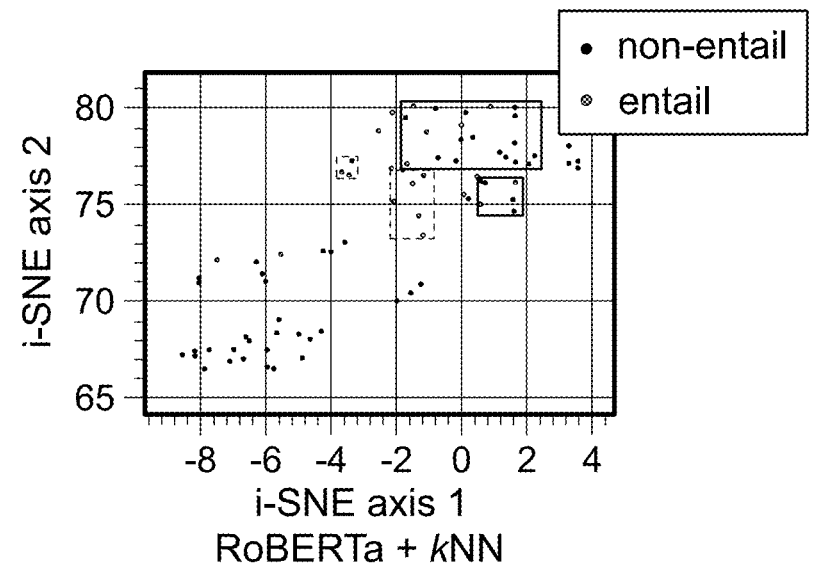

To get a better insight into how kNN improves the fine-tuned models, RoBERTa's learned representations of a sample of the HANS validation set are visualized. The sample is chosen from the particularly difficult constituent heuristic of HANS that assumes that a premise entails all complete sub-trees in its parse tree. FIGS. 10A-10C illustrate how the predictions change when using just fine-tuned RoBERTa vs. in combination with kNN. The kNN approach performs particularly well on the more difficult 'not-entail' class. The representations are projected into two dimensions for visualization.

Thus, kNN can improve the performance of state-of-the-art models especially on input types on which the model is known to perform poorly. In one embodiment, a model's low confidence may be used as an indicator for switching to kNN. The back-off criteria could be anything that is based on the input examples. Slicing the datasets based on the occurrence of certain patterns in the input text like mention of colors or criteria based on syntactic information such as part-of-speech tags or lexical overlap can give a deeper understanding of model behavior. Fine-grained evaluations on such slices on a validation set would highlight data slices where the model performs poorly. Example types that satisfy these criteria can then be classified by switching to kNN for the final prediction.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of identifying inaccurate labels in training data, the method comprising:
   receiving, at a data interface, a training set of sequences, wherein each sequence from the training set is paired with a target label from a plurality of labels;

mapping, by a neural network, each training sequence to a respective normalized hidden representation vector, including:
  computing the respective normalized hidden representation vector based on a dataset-wise batch normalization of hidden representation vectors with a mean and a standard deviation over hidden states of the neural network responsive to the training set of sequences,
  wherein the mean and the standard deviation of hidden states are obtained over the training set of sequences, and
  wherein the computing further comprises dividing a difference between a first hidden representation vector and the mean by a sum of the standard deviation and a numerical stability parameter;
receiving a testing sequence at inference stage;
after receiving the testing sequence at inference stage, mapping, by the neural network, the test sequence to a normalized test hidden representation vector;
determining, among the training set of sequences, a set of sequence indices that lead to a set of smallest distances between respective normalized respective hidden state vectors and the normalized test hidden state vector;
computing, for each training sequence in the set of sequence indices, a weighted probability score based on a set of distances corresponding to the set of sequence indices;
generate a probability distribution over the plurality of labels for the test sequence based on computed weighted probability scores and one-hot encodings of each target label in the plurality of labels; and
identifying a mislabeled training sequence from the training set of sequences when a direct prediction by the neural network is different from a prediction based on the generated probability distribution.

2. The method of claim 1, further comprising:
caching the mapped respective normalized hidden representation vectors at a memory;
and querying the cached mapped respective normalized hidden representation vectors for determining the set of sequence indices and comparing with the normalized test hidden state vector.

3. The method of claim 1, further comprising generating a classifier prediction for the test sequence based on the generated probability distribution.

4. The method of claim 1, wherein the respective normalized hidden representation vector is a representation corresponding to a specific token that is added at a beginning of the respective sequence in a last layer of the neural network.

5. The method of claim 1, further comprising:
generating, by the neural network, a prediction in response to the testing sequence and a confidence score associated with the predicted distribution; and
in response to determining that the confidence score is lower than a threshold, computing the weighted probability score for fine-tuning the prediction of the testing sequence.

6. The method of claim 1, wherein the weighted probability score for each training sequence in the set of sequence indices is computed using a softmax operation over negatives of the set of smallest distances.

7. A system for identifying inaccurate labels in training data, the system comprising:
a data interface that receives a training set of sequences, wherein each sequence from the training set is paired with a target label from a plurality of labels;
a memory that stores a neural model; and
one or more hardware processors that:
  map, by the neural model, each training sequence to a respective normalized hidden representation vector, including:
    computing the respective normalized hidden representation vector based on a dataset-wise batch normalization of hidden representation vectors with a mean and a standard deviation over hidden states of the neural network responsive to the training set of sequences,
    wherein the mean and the standard deviation of hidden states are obtained over the training set of sequences, and
    wherein the computing further comprises dividing a difference between a first hidden representation vector and the mean by a sum of the standard deviation and a numerical stability parameter;
  in response to receiving a testing sequence at inference stage, map, by the neural model, the test sequence to a normalized test hidden representation vector;
  determine, among the training set of sequences, a set of sequence indices that lead to a set of smallest distances between respective normalized respective hidden state vectors and the normalized test hidden state vector;
  compute, for each training sequence in the set of sequence indices, a weighted probability score based on a set of distances corresponding to the set of sequence indices;
  generate a probability distribution over the plurality of labels for the test sequence based on the weighted probability score and one-hot encodings of each target label in the plurality of labels; and
  identifying a mislabeled training sequence from the training set of sequences when a direct prediction by the neural model is different from a prediction based on the generated probability distribution.

8. The system of claim 7, wherein the one or more hardware processors further:
cache the mapped respective normalized hidden representation vectors at a memory; and
query the cached mapped respective normalized hidden representation vectors for determining the set of sequence indices and comparing with the normalized test hidden state vector.

9. The system of claim 7, wherein the one or more hardware processors further generate a classifier prediction for the test sequence based on the generated probability distribution.

10. The system of claim 7, wherein the respective normalized hidden representation vector is a representation corresponding to a specific token that is added at a beginning of the respective sequence in a last layer of the neural network.

11. The system of claim 7, wherein the one or more hardware processors further:
generate, by the neural network, a prediction in response to the testing sequence and a confidence score associated with the predicted distribution; and
in response to determining that the confidence score is lower than a threshold, compute the weighted probability score for fine-tuning the prediction of the testing sequence.

12. A non-transitory processor-readable medium storing a plurality of instructions for identifying inaccurate labels in training data, the instructions being processor-executed by one or more hardware processors to perform operations comprising:

receiving, at a data interface, a training set of sequences, wherein each sequence from the training set is paired with a target label from a plurality of labels;

mapping, by a neural network, each training sequence to a respective normalized hidden representation vector, including:

computing the respective normalized hidden representation vector based on a dataset-wise batch normalization of hidden representation vectors with a mean and a standard deviation over hidden states of the neural network responsive to the training set of sequences, wherein the mean and the standard deviation of hidden states are obtained over the training set of sequences, and wherein the computing further comprises dividing a difference between a first hidden representation vector and the mean by a sum of the standard deviation and a numerical stability parameter;

in response to receiving a testing sequence at inference stage, mapping, by the neural network, the test sequence to a normalized test hidden representation vector;

determining, among the training set of sequences, a set of sequence indices that lead to a set of smallest distances between respective normalized respective hidden state vectors and the normalized test hidden state vector;

computing, for each training sequence in the set of sequence indices, a weighted probability score based on a set of distances corresponding to the set of sequence indices;

generate a probability distribution over the plurality of labels for the test sequence based on the weighted probability score and one-hot encodings of each target label in the plurality of labels; and identifying a mislabeled training sequence from the training set of sequences when a direct prediction by the neural network is different from a prediction based on the generated probability distribution.

13. The medium of claim 12, wherein the operations further comprise:

caching the mapped respective normalized hidden representation vectors at a memory;

and querying the cached mapped respective normalized hidden representation vectors for determining the set of sequence indices and comparing with the normalized test hidden state vector.

14. The medium of claim 12, wherein the operations further comprise:

generating, by the neural network, a prediction in response to the testing sequence and a confidence score associated with the predicted distribution; and in response to determining that the confidence score is lower than a threshold, computing the weighted probability score for fine-tuning the prediction of the testing sequence.

* * * * *